(No Model.) 8 Sheets—Sheet 3.

H. LEE.
Plate Printing Machine.

No. 237,558. Patented Feb. 8, 1881.

Fig. 3.

Attest:
Geo. H. Graham
P. H. Palmer

Inventor
Homer Lee,
by Munson & Philipp
Attys.

(No Model.)   8 Sheets—Sheet 4.

H. LEE.
Plate Printing Machine.

No. 237,558.   Patented Feb. 8, 1881.

(No Model.) 8 Sheets—Sheet 6.

H. LEE.
Plate Printing Machine.

No. 237,558. Fig. 6. Patented Feb. 8, 1881.

Attest:
Geo. N. Graham
P. H. Palmer

Inventor,
Homer Lee,
by Munson & Philipp
Attys.

(No Model.) 8 Sheets—Sheet 8.

H. LEE.
Plate Printing Machine.

No. 237,558. Patented Feb. 8, 1881.

Attest:
G. M. Graham
T. H. Palmer

Inventor,
Homer Lee,
by Muson & Philipp
Attys.

UNITED STATES PATENT OFFICE.

HOMER LEE, OF NEW YORK, N. Y.

PLATE-PRINTING MACHINE.

SPECIFICATION forming part of Letters Patent No. 237,558, dated February 8, 1881.

Application filed October 14, 1880. (No model.)

*To all whom it may concern:*

Be it known that I, HOMER LEE, a citizen of the United States, residing in the city of New York, county of New York, and State of New York, have invented certain new and useful Improvements in Plate-Printing Machines, fully described and represented in the following specification and the accompanying drawings, forming a part of the same.

The present invention relates to improvements in the art of plate-printing, and especially to such art as carried out by that class of plate-printing machines in which one or more moving wiper-cloths are automatically operated to perform the wiping and polishing operations upon the engraved printing plates or surfaces, which improvements are fully described in the following specification and shown in the accompanying drawings.

In said drawings a plate-printing machine embodying my improvements is represented in Figure 1 by a right-hand side elevation, in which view some of the mechanisms are omitted to more fully show others.

Printing from engraved plates as performed by hand requires the workman to frequently change the surface of the wiper-cloth by turning it in his hand, so as to frequently present a fresh wiping-surface to insure its perfect action upon the plate. This wiper-cloth acts not only to clean the surplus ink off from the surface of the plate, but must also rub the ink into the graven lines of the plate before the finishing or polishing of the same is effected, to prepare the plate to receive the sheet upon it that it is to print. To produce perfect work it is also requisite that this rubbing-in, wiping, and polishing operation shall be such as to wipe the ink off from the unengraved portion of the plate, and yet not dislodge the ink which has been deposited in the graven lines. Consequently the movement of the wiper must be such as not to follow the direction of the engraved lines, but, on the contrary, be made across the cuts in a sort of serpentine path to properly prepare the plate, so that it shall produce a sharp, clear, and perfect print.

It has been found very difficult to produce uniformly good prints by the hand process, for the reason that the final polish of the plate, performed by the palm of the printer's hand, is necessarily irregular, because of his inability to make the same exact wipe and polish for each consecutive impression; or, in other words, the human hand lacks the precision of the automatical movements of mechanical devices.

In the accompanying drawings my invention is shown as applied to a flat press having a reciprocating bed carrying the engraved plate; but my various improvements are also applicable to any horizontally-moving bed, or to a cylinder holding the engraved plate or several of them fitted to its surface, and equally well to an engraved cylinder, which cylindrical form of plate-printing surface is well adapted to the printing of an endless piece of paper or web.

A ready understanding of the improvements effected and made the subject-matter herein will best be arrived at by a preliminary description of the principal elements of the machine as a printing mechanism, which will be first given, and then the structure and operation of the said improvements will be pointed out in detail.

The printing mechanism proper is of that class known as a "stop-cylinder," for the reason that its impression-cylinder 51 has an intermitting rotary movement, and stands still while the reciprocating bed or plank 52, with the engraved plate 20 and inking-table 53 it carries, moves forward and back to cause the inking and wiping of said plate and to permit a discharge of the printed sheet, the stationary period of said cylinder affording the necessary time to feed, lay on, register, or point the sheet, while its rotation is accomplished during the rearward movement of the bed or plank to produce the impression, as is well understood. The impression-cylinder 51 has its shaft 54 journaled in movable boxes arranged to slide in slotted brackets, within which they are fixedly adjustable vertically by screws 55.

Figure 5:
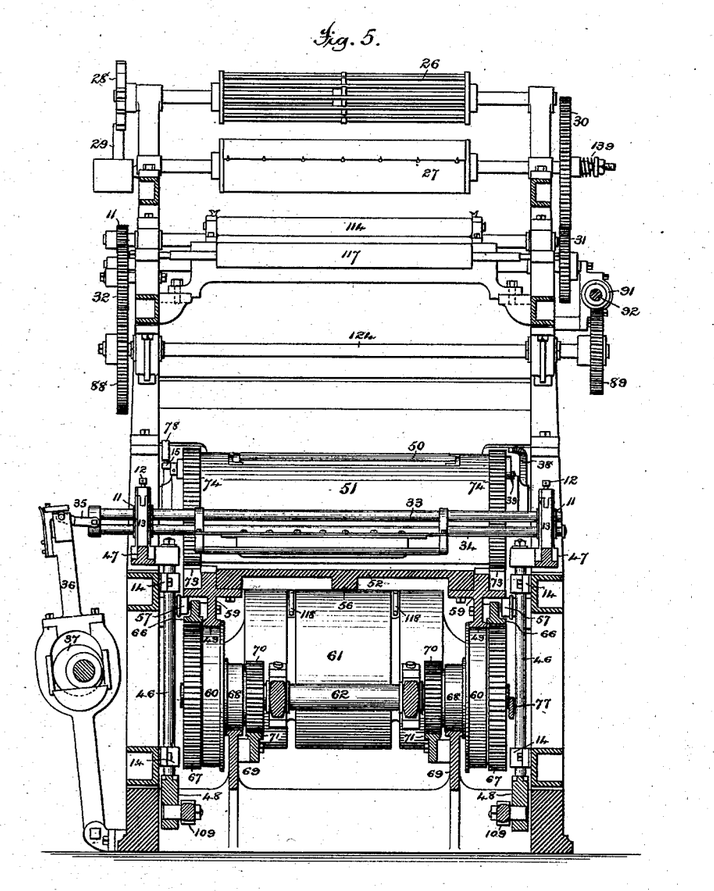

The bed or plank 52 is a metal body suitably recessed or otherwise constructed to receive or have the printing plate or plates secured upon its surface, and has a central bearer or rib, 56, and bearers 59 at each of its sides, whereby it rests during portions of its reciprocations, or is supported as follows: It is supported during the period of producing the impression by means of its solid portion, (see Fig. 5,) which bears upon a supporting-cylinder, 61, the shaft 64 of which is journaled in boxes that are adjustable in slotted bearings of the side frames by means of screws 65. The side bearers, 59, have outwardly-projecting flanges that bear upon a series of friction-rollers, 57, that are carried by studs 58 projecting from arms pivoted to the side frames and provided with means for adjusting the position of the rollers. The side bearers, 59, have vertically-depending ribs, as 49, each of which rests upon the rim of a flanged wheel, as 60, hung on the shaft 62 of the bed-carriage. The central rib, 56, aids in supporting the ink-table end of the plank as it passes over the cylinder 61.

Figure 2:
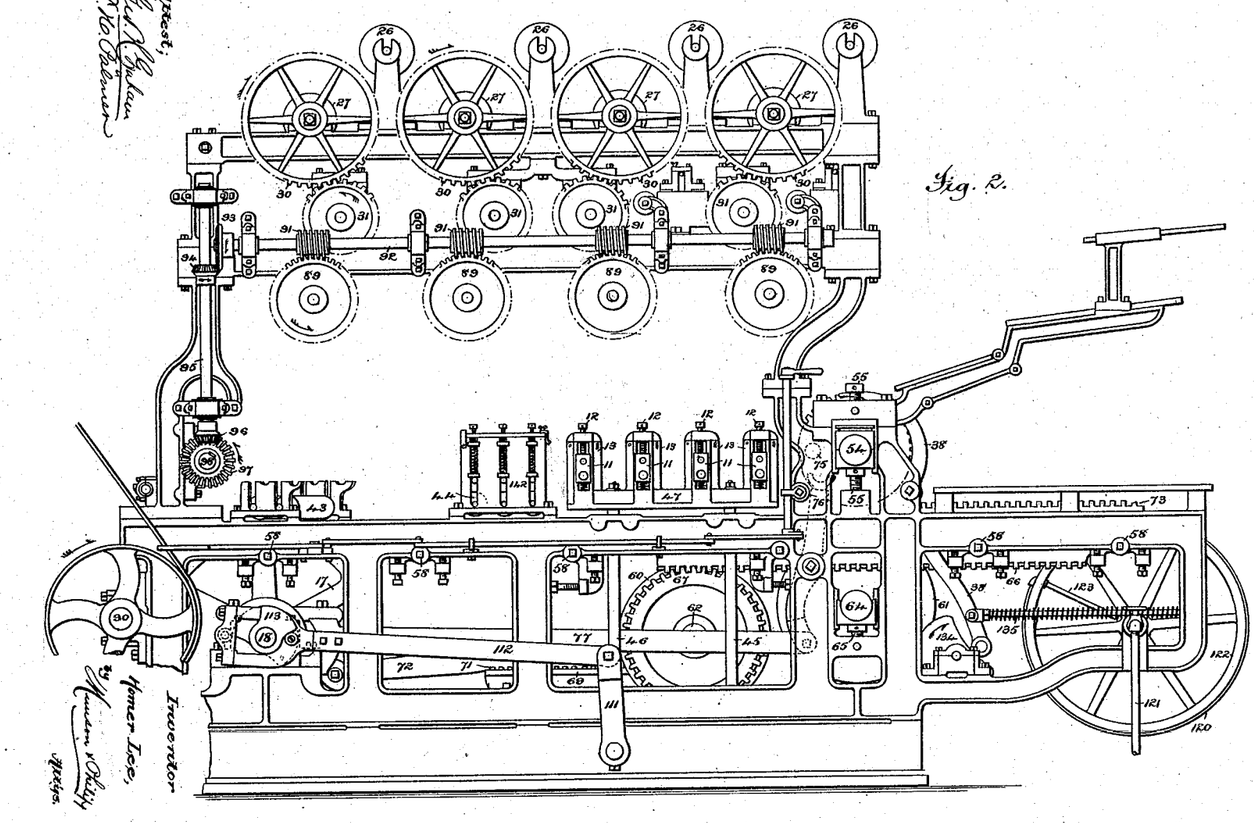
Fig. 2 represents a left-hand elevation thereof.
Figure 4:
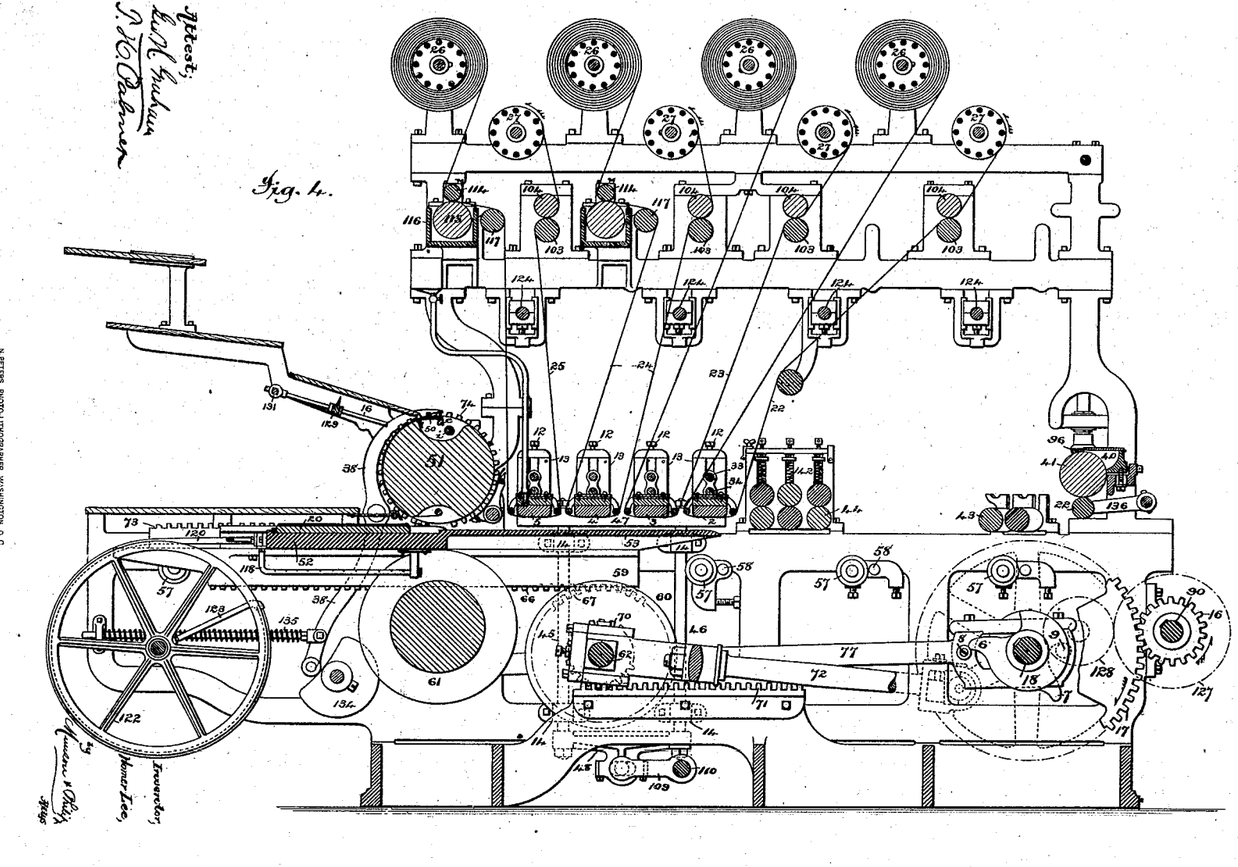
Figs. 4 and 5 represent, respectively, longitudinal and transverse sectional elevations.

The reciprocations of the bed or plank are produced by means of the bed-driving carriage, as follows: The bearers 59 have bolted to their outer faces racks 66, which mesh with toothed wheels 67, that are fast upon the shaft 62 of the bed-carriage, said shaft also carrying flanged wheels 68, which roll on fixed rails 69, and likewise supports pinions 70, which mesh with and travel in stationary racks 71. The shaft 62 of the bed-carriage is embraced by the arms of a connecting-rod, 72, that is pivoted to a crank-wheel, 17, carried by a short shaft, 18, that is mounted on one side frame and a pillow-block, 130, so as to extend part way across the machine, and thus provide for the passage of the rod 72. This crank-wheel is driven by means of a toothed perimeter that is engaged by a driving-pinion, 16, on the shaft 90, and during one-half of its revolution causes the pinions 70 to traverse the racks 71 rearwardly, thus imparting a similar movement to the bed or plank through the toothed wheels 67 and racks 66, while during its remaining half-revolution said shaft and crank-wheel will cause a reverse or forward movement of the bed or plank, during which periods the carriage travels upon its rails 67 and the bed upon the roller 57, wheels 60, and cylinder 61 at double the speed of the bed-carriage, in consequence of the proportion the pinions 70 bear to the wheels 67, and at an equal surface speed with the impression-cylinder 51, which is wholly driven by the said bed or platen, by means of driving-racks 73 projecting upward from the side bearers, 59, of the bed and meshing with toothed wheel 74, carried at each end of the shaft 54 of said cylinder. These wheels 74 are mutilated, as is seen in Fig. 4, so that the racks 73 may disengage the same after the impression is accomplished, whereby the bed may complete its rearward stroke, move forward to be inked, and again rearward to be again inked and be wiped and polished, said racks being re-engaged during such rearward movement to cause the cylinder to rotate with the paper which has been fed to it and produce the impression by the following means:

When the impression-cylinder has completed an effective or printing revolution its movement is arrested by means of a stud or tooth, 75, which projects from one of its heads and enters the socket of an arm, 76, wherein it rests while the racks 73 pass out of the teeth of the wheel 74. This arm 76 is pivoted to the side frame (see Fig. 2) and to a connecting-rod, 77, whose opposite end has a saddle that rests upon the shaft 18 and carries two opposite friction-rollers, 8 9, which are situated so as to bear upon opposite cams fixed on said shaft, which cams are arranged so as to produce a positive reciprocation of the rod 77 and consequent positive vibrations of the arm 76. When the said arm is in position to arrest the impression-cylinder, as in Fig. 4, the roller 8 bears upon the projection 6 of one cam and the roller 9 rests within the low part of the other cam, said cams slowly moving. When the machine has so moved that the time for the rotation of the impression-cylinder is reached the roller 8 passes off the part 6 into the low part of its cam and the roller 9 rides up over the high part 7 of its cam. This produces a forward vibration of the arm 76 and partially rotates the impression-cylinder so as to bring the teeth of its wheels 74 into position to be engaged by the racks 73. It moves far enough to accomplish this and clear the tooth 75, and then makes a return movement, so as to be in position to again arrest the cylinder as its rotation is completed. While the cylinder is at rest the sheet-griper 50 with which it is provided stands in an open position, so that the sheet may be laid beneath it. The griper is here shown as a continuous lip projecting from a rock-shaft, e, to which it is attached, as is common, which rock-shaft e is actuated by means of pinions or segments, one of which is on a spring-seated rock-shaft, i, the latter having a rock-arm, 15, at one end, that projects so as to engage the end or cam surface of a bar, 78, that is pivoted to the side frame and operated by a cam, 79, that is carried by a short shaft, which is rotated in proper time, by means of a worm, 82, and wheel 83, from the longitudinal or side shaft, 81. This bar 78 is pressed against the cam by a spring, 84, and while its end is engaged with the high part of the cam 79 it sustains its cam end is held in its lowest position, and consequently will press down the rock-arm 15 and cause the gripers to stand open, and the cam 79 so moves as to permit the end of the bar 78 to enter its low part and allow the griper to close just before the impression-cylinder starts.

In order to register a sheet for a second impression, or for any other purpose, I have provided a pointing mechanism, that consists of one or more needles or points automatically projected above the feeding-table, so as to secure both the front and the rear ends of the sheet, or either, as may be desired. The needles or points for registering the rear end of the sheet project from an adjustable collar or collars, 129, carried on an arm or arms, 16, that are fast to a shaft, 131, that is vibrated by means of a rock-arm, 132, and having its forward end socketed to embrace the end of a rock-arm, 140, whose cam-faced front end is thus held in proper position to be engaged by the stud or roller 19 carried by the lever 78, and thus timely withdrawn as the gripers operated by said lever 78 close. The needles or points for holding or registering the front end of the sheet are mounted at the end of a rock-arm, 200, on a rock-shaft, 201, hung on the impression-cylinder, see detached view, Fig. 3, (it may be in a slide moved by said rock-arm,) from the end of which shaft a rock-arm, 39, is arranged so as to stand in a position to be acted upon in proper time and in a manner similar to that in which the griper is operated—namely, by a bar, 38, that is vibrated by a cam, 134, on the shaft of cam 79, which bar is held forward by a spring-seated rod, 135.

The inking mechanism consists of a fountain or trough, 40, from which the body of ink is carried by a fountain-roller, 41, and thence taken by a vibrating transferring-roller, 42, and deposited upon the end of the inking-table 53 as the latter passes beneath said roller 42 during the reciprocations of the bed or plank. This transferring-roller 42 is carried by rock-arms 136, that project from a shaft that is vibrated at proper periods of time by a rock-arm, 137, and a cam, 138, on the shaft 98. The ink thus deposited upon the table is distributed by the rollers 43, and the distributed ink is taken up by the form-rollers 44 and transferred to the engraved plate 20 as it passes beneath them. The plate is inked by one or more pairs of form-rollers, 44, of peculiar construction, and in this case I show three pairs of rollers, the three upper rollers of each pair of which are heavy or weighted rollers, while the lower rollers of the pairs are formed of sectional pieces of fabric strung upon a shaft and pressed tightly together by screws and nuts, that construction having been found most suitable, as rollers so made are capable of having their surfaces made hard or soft, according as their adjusting-nuts are moved, and thus adapted to suit a shallow or deeply-engraved plate to properly ink the same. In order to render these rollers capable of ready adjustment to bear with any requisite degree of force upon the plate in depositing the ink into the deepest parts of the plate, I have mounted springs in the sockets of their holders 141 142, which springs are attached at each end to guiding-heads a, adapted to embrace and slide upon the walls of said sockets. The sockets have rounded corners at the upper or open ends, so as to provide for the ready entrance of the said springs and their guiding-heads. Over the said springs a cap, 144, carrying adjusting-screws o, is arranged, so that the force of the springs may be independently adjusted, and each end of the rollers thus have its pressure regulated, whereby the rollers may be adjusted at each end independently, and thus bear upon and perfectly ink rounding or otherwise uneven-surfaced plates. The ready removal and replacement of the rollers and their springs are effected by hinging the heads or caps 144 to the holders 141 142 and providing them with means for locking in place. This lock consists of a swinging piece, 145, the shank of which is hinged to the holder 141 or 142, and carries a right-angularly projecting head, in which a thumb-screw, 146, is tapped. The shank of the piece 145 enters a slot in the end of the cap 144, and thus clamps the same down onto the holder 141 or 142. Upon swinging the cap upward the springs and rollers may be conveniently removed, and these parts may be readily replaced, the cap 144 swinging down to press upon the springs, which will be guided into their sockets by the rounded corners thereof, and the whole firmly held in place by the thumb-screw 146, so that no jarring action of the press can disengage them, and thus allow the springs or other confined parts to escape and enter the press and injure the same.

In order to wipe and polish the inked plate, and thus prepare it to print a perfect impression, a wiping and polishing apparatus is made use of. In this instance I have found it desirable to use several traveling wiper-cloths, 22 23 24 25, and reciprocating carriers, to which are attached flexible pads 2 3 4 5, each fitted to its carrier. The two side frames are extended above the level of the bed to form supports, and in them are journaled skeleton-carriers, upon which the wiper-cloths are wound and unwound, the appliances for moving the wiper-cloths during the operation of printing being also carried by this extended framework. The upper tier of skeleton-carriers have the wiper-cloths wound upon them. Each cloth works independently of the others, and passes downward from this skeleton-carrier to and under its pad and upward and around a skeleton-carrier of the lower tier, upon which it is wound automatically. Each wiper-cloth also passes through, around, and between several other rollers provided for feeding and drawing up its slack as desired. These wiper-cloths are so arranged that they unwind from one skeleton-carrier, as 26, and wind upon another skeleton-carrier, as 27, the shafts of the former skeleton-carriers being provided with a let-off mechanism consisting of a star-wheel, 28, the teeth of which are engaged by a weighted dog, 29, which operates to press the star-wheel rearward, and thus exert a pressure upon it sufficient to take up whatever slack there may be in the wiper-cloth. Practically this weighted dog fails at times, after escaping a tooth of the star-wheel, to be engaged by the next tooth of the star-wheel, and thus be in proper position to accomplish its function. I therefore limit its downward movement by means of an inwardly-projecting pin, n, carried by it, that engages a rubber cushion, c. The proper action of the dog with respect to the wheel 28 is thus provided for, and when the lever is thrown upward by the action of the tooth of the star-wheel upon its dog the pin on such lever meets the spring S, that is elastic enough to permit the dog to pass the tooth of the wheel 28, which spring reacts to move said lever forward, so that its weight may press the dog against a tooth of the wheel 28, and thus tighten the wiping-cloth. The shafts of the skeleton-carriers 27 are each provided at one end with a toothed wheel, 30, which engage toothed wheels 31, that are carried upon the shafts of the driving-rollers 103. The wheels 30 are loose upon their shafts, and are held in driving contact with a hub thereon by means of adjustable springs, whereby they may be loosened, so as to allow the skeleton-carriers to be turned independently of the wheels 30, which springs also operate to allow the wheels to slip on their shafts when great tension is exerted upon the winding wiper-cloth. (See detached view, Fig. 5.) The shafts of rollers 103 each carry upon their opposite ends pinions 10, which are engaged by toothed wheels 32, that turn on studs that are adjustable in various circumferential relations to the pinions 10, as appears in Fig. 1. The driving toothed wheels for these wheels 32 (respectively marked 85 86 87 88) are mounted upon tranverse shafts 124, that are adjustable, as shown in Fig. 4, which shafts 124 are turned at a uniform speed by means of worm-wheels 89 on their opposite ends, which receive motion from worms 91 on a shaft, 92, that is moved by miter-wheels 93 94, a shaft, 95, miter-wheels 96 97, and the ink-fountain roller-shaft 98, that carries a toothed wheel, 99, which is driven by intermediate gears, 100, 63, 101, 102, the latter of which is on the driving-shaft 90, the regular movement of which shaft is provided for by a fly-wheel, 125, mounted upon a short shaft hung in one side frame, and a pedestal, 126, and set in motion by the driving-shaft 90, a driving-wheel, 127, and a pinion, 128.

Figure 1:
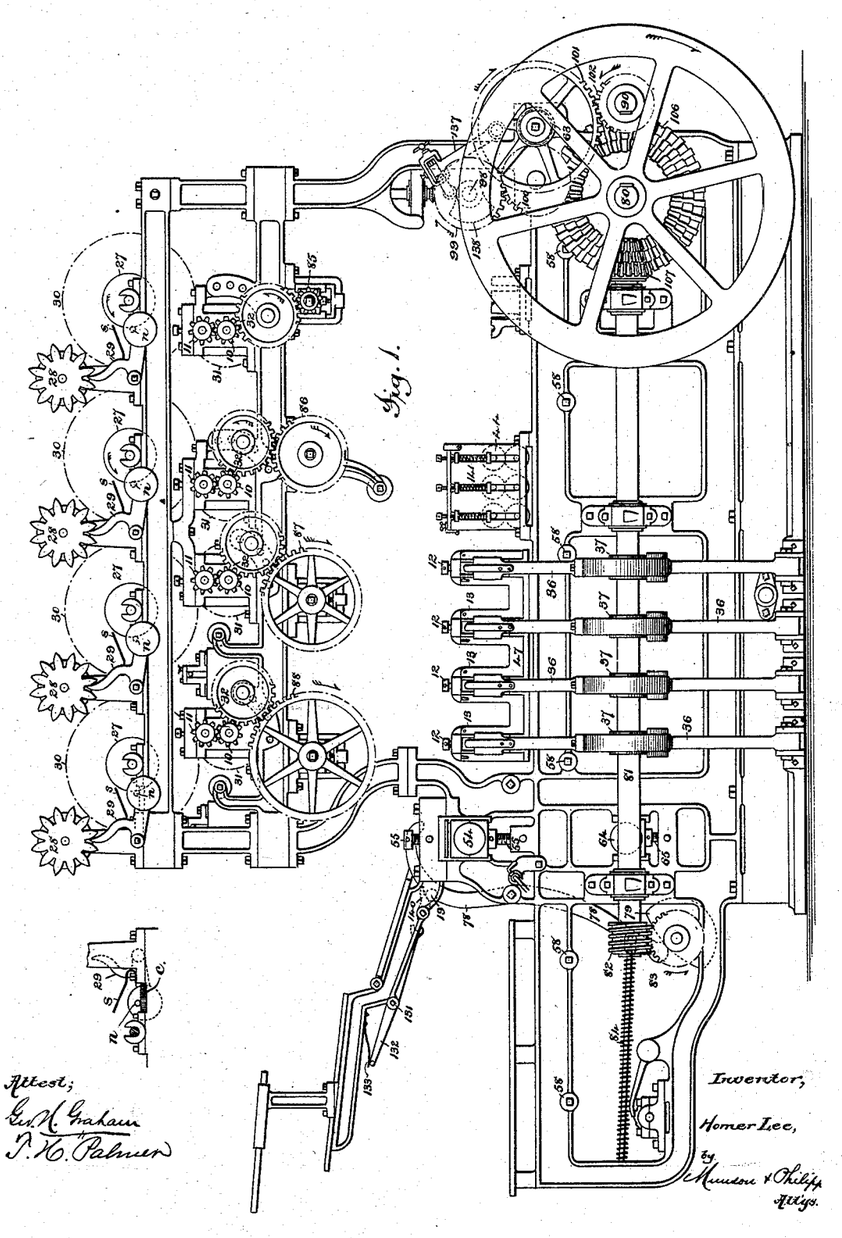
Figure 3:
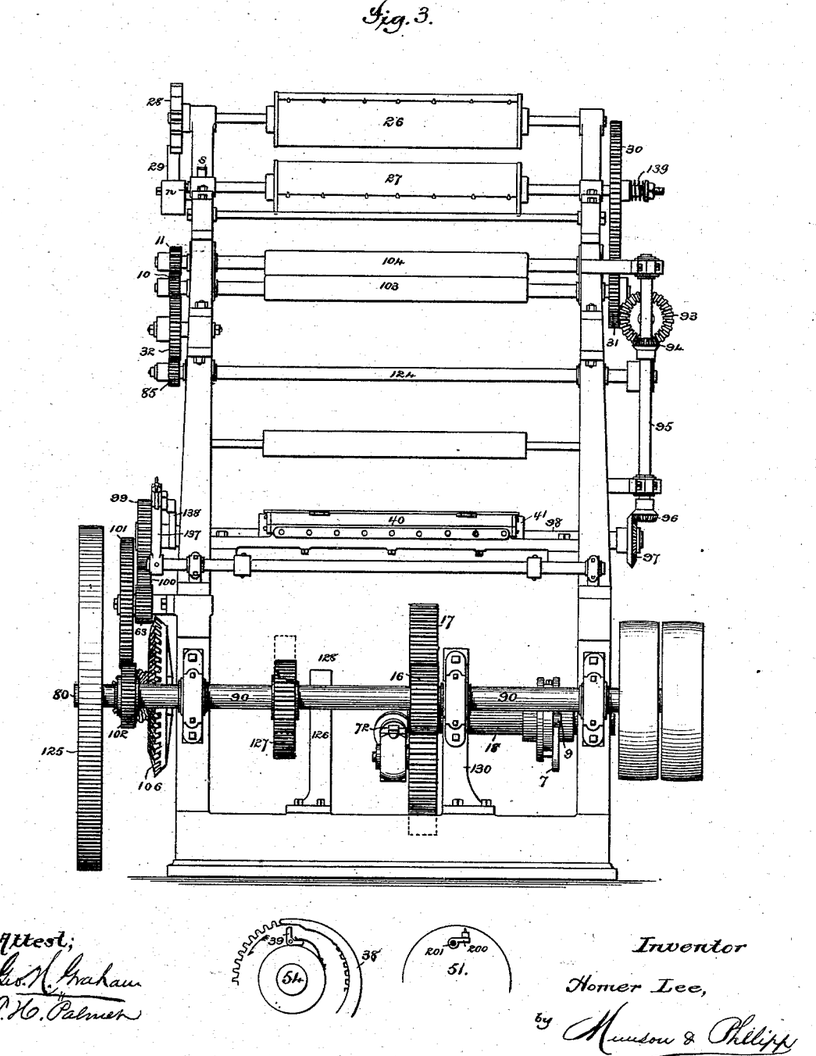
Fig. 3 represents a rear-end elevation of the same.

The shafts provided with the pinions 10 carry the lower members of pairs of wiper-cloth feeding or drawing rollers 103 104, one set only of which is shown in Fig. 3, and the rollers 104 are driven in unison with their companions by means of pinions 11, that mesh with the pinions 10. The rollers 103 104 thus travel uniformly and continuously; but they are so arranged that they may be made to feed out and draw up smaller or larger quantities of cloth, as may be desired. Thus the cloths can be fed out and drawn up by a continuous movement at one uniform speed by using toothed wheels of equal diameter in the place of those marked 85 86 87 88, the wheels 32 being adjusted in proper position to connect them with the pinions 10. The cloths may also be moved continuously at different speeds by using proper sizes of wheels 85 86 87 88. For instance, with these wheels proportioned as shown in Fig. 1 the largest feed-wheel, 88, nearest the impression-cylinders, will cause the wiper-cloth 25 to move sixteen units, the next wheel, 87, its cloth 24, say, twelve units, the next wheel, 86, its cloth 23, say, eight units, while the smallest wheel, 85, will move the cloth 22, say, at two units. Thus the following advantages are gained:

The continuous feeding movement insures a constantly-changing wiping-surface, accomplishing uniformity in the wiping, and therefore avoids the possibility of streaking or otherwise inferior wiping. If the plate to be printed has a portion of its work cut very deep and wide, it requires a slow and sluggish movement of the wiper-cloths to more perfectly deposit the ink in the depths of these cuts. To effect this some of the wiper-cloths are given a slow motion—say one-eighth of an inch—while the others are moved more rapidly. Thus while the slow ones deposit the ink the faster-moving ones wipe the surface of the plate. Thus the wiper-cloths may have their movements adjusted so as to wipe any deeply-engraved plate or any slightly-cut plate, or both in one. With this onward movement of the wiper-cloths is combined a reciprocating one across the plate, or in a direction across its path of travel. This is accomplished by mounting the carriers (which are shown as rods 33 34) that carry the flexible pads 2 3 4 5, over which the wiper-cloths are stretched and by which they are held onto the plate, in journal-boxes 11, that have positive vertical adjustment, by means of screws 12, in guides 13, that rise at points over the opposite side frames from their vertically-adjustable carriage, said carriers or rods 33 34 (one of which might be omitted) being provided at one end with links 35, connecting them to rocking levers 36, that are pivoted near the base-plate, and vibrated by eccentrics or cams, as 37, fixed upon longitudinal shaft 81, which is geared to a tri-toothed bevel-wheel, 106, on the main shaft 80 by a similar pinion, 107, whereby a steady jigger movement of great power is imparted to produce the reciprocations of said carriers and the wiper-cloths.

Better work may be accomplished by varying the strokes of the wiper-pads as the plate passes under them, and to do this the eccentrics or cams 37, reciprocating the two carriers nearest the printing-cylinder, may give a longer, and consequently faster, stroke than the other two; but it is not to be understood that they cannot all be operated with the same length of stroke, or that they may not all have different strokes, if desired; but, as above stated, in this instance there are two lengths of strokes. The wiper-cloths may thus automatically be fed forward at different speeds, and also have their to-and-fro movement varied, thus adapting the machine to perform the inking, wiping, and polishing of any kind of engraved plate. The carriers, and with them the pads and cloths, are lifted up bodily after the plate has passed beneath them and is near the cylinder, for the twofold purpose of slacking up on the cloths to allow their automatic shifting to be more easily performed, and to be out of the path of travel of the plate on its return for its next impression. They thus lower to wipe the plate, then rise as it moves to be inked, and then lower for the next impression. This is accomplished by their vertically-adjustable carriages before alluded to, which consist of pairs of rods 45 46 at each side of the frame, which are secured to the plates 47 from which the guides 13 rise, play in guide-eyes, as 14, and at their bottom ends are connected to cross-heads 48, in the center of which the ends of rock-arms 109, fast to a rock-shaft, 110, are pivoted. This rock-shaft projects through one side frame and derives its movements in proper time, by means of a rock-arm, 111, and a connecting-rod, 112, from a cam, 113, fast on the shaft 80. (See Fig. 2.)

Figure 11:
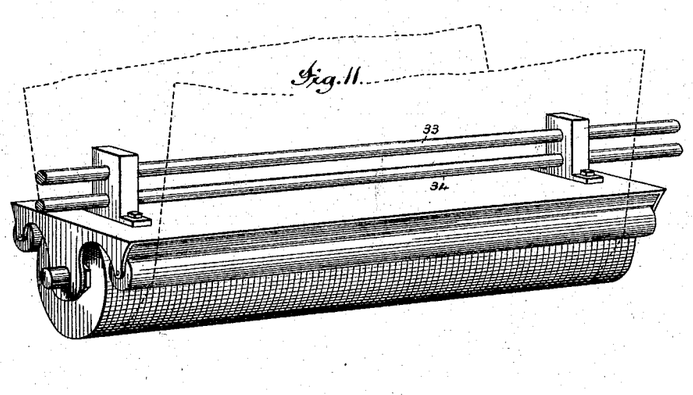
Figure 12:
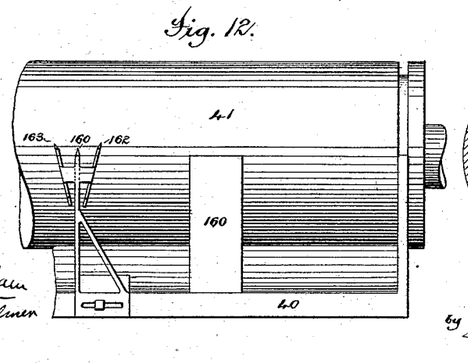
Figs. 12 and 13, a structure of the ink-fountain.
Figure 13:
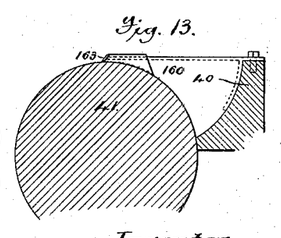
Figures 14, 15, 17, 19:
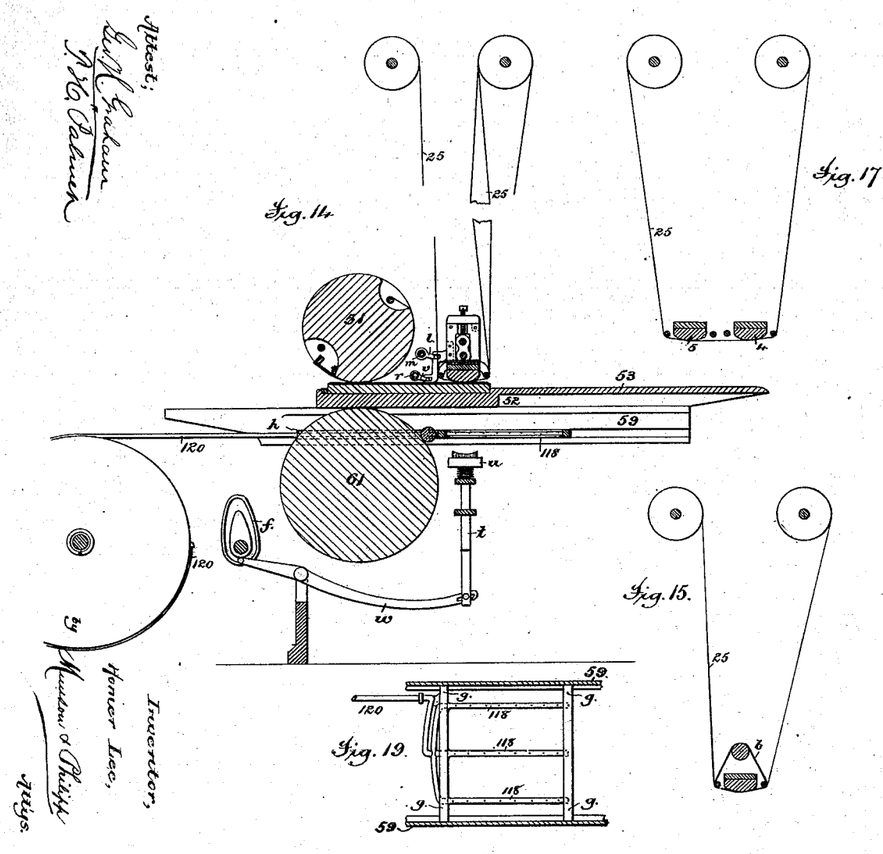
Fig. 14, a whiting apparatus.
Figs. 15 to 18, various forms of wiper-cloths.
Fig. 19, the plate-heating apparatus.

The wiper-pads or elastic supports over which the wiper-cloths pass in the most approved plate-printing presses as now constructed are fixed surfaces over which the said cloths are moved. They consequently always present the same surface of pad to the wearing action of the rubbing operation, and soon become so worn or compressed as to require renewal. To obviate this defect I have constructed a wiper-pad in circular form, (see Fig. 11,) and so mounted it in its carrier that it will revolve as the wiper-cloth is moved onward. This movement may be produced by the friction of the passing wiper-cloth, or by a ratchet-and-pawl movement; or it may be constantly revolved by any gearing, so as not only to move onward with the wiper-cloth, but have a motion while the cloth is stationary and the wiping operation is being effected, in this latter case operating not only to press the cloth onto the plate with an elastic force, but to perform a sort of brushing action that produces the effect of increasing the wiping action, and thus rendering a less number of wiper-cloths necessary. This pad is preferably formed by mounting a number of disks of cloth or the like flexible material upon a shaft, or it may be constructed of a cylinder properly clothed with laps of such material, and, whether constructed in either form, it may have a leather, oil-silk, or like covering, thereby securing the requisite elasticity and durability. In existing machines I may produce these effects by means of an endless band of rubber or other material suitable, that is passed between the pad proper and the wiper-cloth passing over it. This band may be moved with the wiper-cloth in its onward feed, or be positively and constantly fed over the pad without regard to the forward movements of the wiper-cloth. This rubber band is shown in Fig. 15 as combined with a pad having a fixed surface; but it will be readily apparent that such band of rubber or other material may be in like manner combined with a wiper-pad of the form shown in Fig. 11.

In practice the flexible pads for the wiper-cloths become flattened by long use, and thus, lying perfectly flat upon the engraved surface, lose a great part of their elasticity. In order to restore or maintain their bearing-face in a rounded form, I provide them internally with a curved plate, 149, against which the stuffing of the pad rests, which plates may be pressed by set-screws 150 so as to bulge out the pad, and thus give it a rounded bearing-face.

In order that the wiper-pads may perform the inking in, this plate 149 may be adjusted in an angular position, so that more pressure will be exerted at one side of the pad than at the other. This done the inked portion of the plate will readily pass under the pad and gradually be pressed and rubbed with increasing power. This feature, though shown herein, is made part of the subject-matter of another application.

In plate-printing machines where the wiping of the plate is accomplished by automatically-moving wiper-cloths passing under elastic pressing-surfaces holding said cloths in contact with the engraved surface to be wiped, said cushions have been constructed with cloth faces and some suitable elastic stuffing or packing. Experience has determined that wiper-cloth supporting-pads thus constructed are inefficient in their action and defective by reason of their non-durability. Thus it is found, after a short period of operation, that the wiper-cloths passing in contact with the similar material composing the face of the wiper-pads has such an affinity therefor as to cause a destructive frictional wear. I have discovered that by forming the bearing-face of the wiper-cloth supporting-pads of leather or material having a similar surface, as oiled silk or rubber cloth, I am not only enabled to produce a sufficiently elastic pad for the purpose, but one whose wearing-surface has a great durability and a peculiar coaction with the wiping-cloth passed across it and pressed thereby upon the engraved surface, from the use of which greatly advantageous results flow and printing reaching a high degree of perfection is attained.

In practice I find it desirable to use four wiper-cloths, as shown. Of these the two wiper-cloths next the printing-cylinder perform the wiping function *per se*, and they are constructed so as to be moistened, as will hereinafter be explained, while the remaining two operate as inkers—that is to say, they rub or deposit the ink into the cuts or engraved portions of the printing-surface, as contradistinguished from removing said ink from such surface. They, however, do take up the surplus or "fat" ink, and I therefore prefer that the inking-in or drywiping-pads shall bear the leather or equivalent surface, while the ink-removing wiping-pads shall have a cloth surface in order to aid the damping of the wiper-cloths.

In printing some kinds of plates I may use wiper-pads all of which have leather-covered faces. I may thus use one or more leather-covered pads, and in order that the pads may have a peculiar action all or any one of them may be disconnected from the mechanism which reciprocates them by removing a link, 35, and thus remain stationary, but at the same time act as a scraper-pad, under which a wiper-cloth will travel continuously and carry off the surplus or fat ink.

In all automatic plate-printing machines heretofore devised it has been the practice to run a long length of wiper-rag onward until one of its surfaces was used up. I have devised a means whereby, when two wiper-pads are used, the said cloth may be carried under the first wiper-pad to have one of its surfaces used in wiping, then leading the same, after turning it around, over a carrying-roller, and leading it therefrom under a second wiping-pad, thereby presenting its opposite or clean surface for use as a wiping medium. This is shown in Fig. 14, where the wiper-cloth 25 is shown as being turned to present its opposite or clean face after its other face has passed the first wiper-pad.

Figure 16:
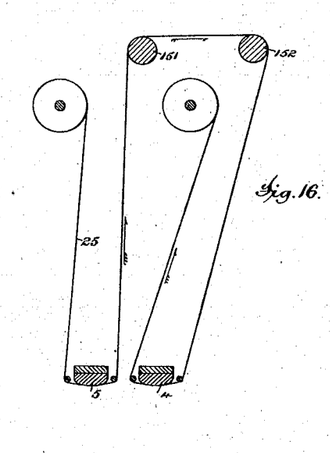

I am aware, of course, that many means may be devised for turning this wiper-cloth, in its passage between one wiper to the other, so as to present opposite working faces, as described. I have shown one modification of such arrangement in Fig. 16. Here a wiper-cloth, as 25, passes under a wiper-pad, as 5, is led thence over two bending-rollers, as 151 152, and thence rearward under the wiper-pad 4, and thence upward to be wound up in a roll. By this means one surface of the cloth is presented as it passes over the wiper-pad 5 and the opposite surface is presented as it travels over the wiper-pad 4.

It is well known to those skilled in the use of automatic plate-printing machines that a wiper-cloth, in passing over the wiper-pad that last engages with the inked plate when the same has passed under one other wiper-pad, which removes the greater part of the ink from the surface thereof, the wiper-cloth caused to travel over said last wiper-pad is kept pretty clean, for the reason that it has little ink to remove. It is therefore in a perfect condition to be used over any wiper-pad operating prior to the last one. In order to utilize this condition of things, I have also arranged a single wiper-cloth, as 25, to pass over two wiper-pads, as 5 4, before being wound up. Thus the surface stretched over the wiper-pad 4 will, it is obvious from the previous description, take up a pretty large quantity of ink from the surface of the plate, while the cloth then lying under the pad 5 will be charged with but very little ink in consequence of the clean condition of the plate, so that as the wiper-cloth 25 is fed forward this portion of it which has been operated upon while stretched under the wiper-pad 5 will be carried under the wiper-pad 4, and be in the best possible condition to operate in wiping the great body of ink from the plate.

I am thus enabled to make a double use of the same surface of the wiper-cloth. Moreover, as the wiper-pads 4 5 may be reciprocated simultaneously in the same direction, in opposite directions, or be otherwise reciprocated with relation to each other, and each be independently adjusted with respect to the printing-surface, the action of this wiper-cloth will perfectly accomplish its functions.

The improvement effected by the use of one or more single wiper-cloths when passed over two or more wiper-pads is made the subject-matter, in part, of a separate application; but it is to be understood that this system of stretching a single wiper-cloth over two or more pads may be combined with that of turning the cloth over to present its opposite side to other wiper-pads.

Figure 18:
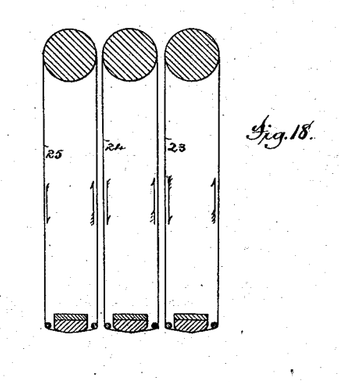

I have shown in Fig. 18 wiper-cloths the ends of which are joined together to constitute them endless wiper-cloths, the dimensions of which may be any that convenience suggests or which the nature of the work requires. These endless cloths may be used singly or in series.

In plate-printing machines provided with means for mechanically wiping and polishing the printing-surface it is highly advantageous to apply moisture to one or more of the wiper-cloths, preferably to the ones last having contact with the plate, in order to remove any remaining particle of ink and like matter that, sticking to the plate after its passage beneath dry wiping-cloths, would injure the impression. This may be accomplished by passing the cloth in contact with a damping-roller, as 115, that runs in a fountain, as 116, in which a proper supply of water or other appropriate liquid is contained. It is best to run the cloth between a pressing-roller, as 114, and the damping-roller 115, as shown, and in order to clear the fountain it should be led over a guide-roller, as 117. This arrangement is of great advantage in itself; but in consequence of its applying the damping-liquid to the wiper-cloth at a considerable distance from the point where said wiper-cloth acts upon the plate, it may defectively operate by reason of the varying condition of the atmosphere, the stopping of the machine, and other causes, so that an even and uniform damping may not be maintained and defective work result. To prevent this the wiper-cloth is not only damped by passing through the damping apparatus just described, which is situated a distance from the wiping-point, but at the last-named point is slightly recharged with a sufficient quantity of the damping-liquid to restore any lost moisture, or has sufficient moisture imparted to it at that point to render its condition the fittest possible for the work it is to perform. To accomplish this the wiper-pad is provided with a duct for disseminating the liquid through it, which may consist of a perforated pipe, as 147, arranged to carry the fluid into the body of the pad and distribute it over the surface thereof, or it may be one or more sponges or other good moisture-conducting material arranged in its body in such position that when charged with liquid will give off the requisite quantity to properly dampen the wiper-cloth passed over the pad. To supply the moisture to such pad a supply-pipe, as 143, part or all of which may be flexible, leads from a reservoir, as 149, placed at a suitable point, to and properly connected with the elbow 148 of the pipe 147, or to a pipe connected with the sponges or otherwise communicating with the moisture-conducting material; and if this reservoir 149 is to contain the same liquid as that used in the fountain 116 said reservoir may be placed conveniently beneath the fountain, so as to be charged therefrom by means of a cock admitting the passage of the liquid from one to the other, or be separately charged with the liquid. The flow of the liquid from the reservoir 149 is controlled by a cock in the pipe 143.

The effective operation of the dampened wiper-cloth may be greatly increased by steaming the same at a point near that of its wiping action, such steaming operating to heat the moistened cloth and thus raise its temperature, so as to prevent the injurious action or cooling of the heated printing-surface. In some cases this steaming will be found to afford in itself a sufficient damping of the cloth.

Figure 7:
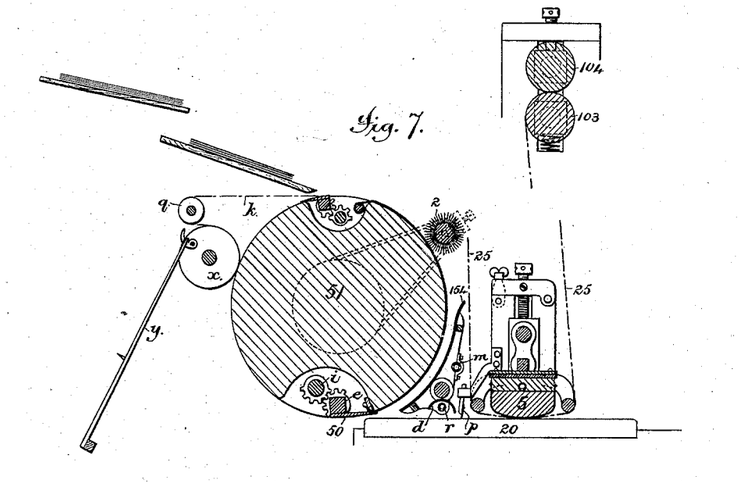
Fig. 7 represents the feeding and delivering mechanism.
Figure 8:
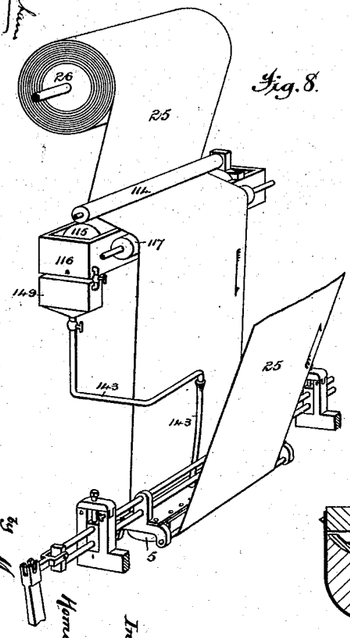
Fig. 8 represents the damping apparatus.
Figure 9:
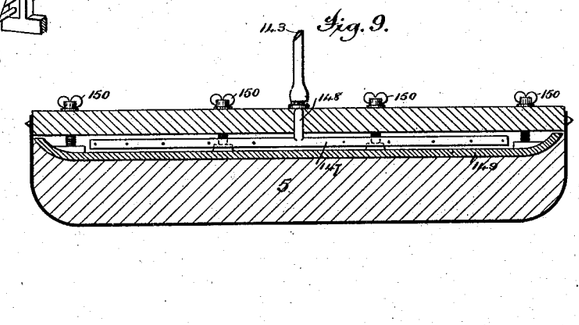
Figs. 9, 10, and 11, an improved construction of wiper-pads.
Figure 10:
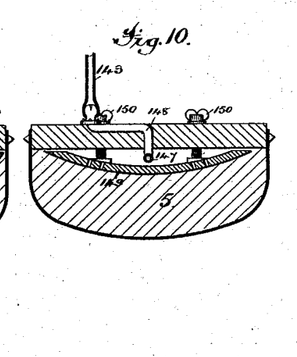

The means for steaming the wiper-cloth is shown in Figs. 7 and 14, where a pipe, $m$, is perforated on the side toward the cloth 25, to emit moist steam directly upon said cloth at a point near its passage under the wiper-pad 5. This pipe $m$ will be connected with any source of supply and have the flow of steam into it, and consequently through its eduction-perforations, by means of a cock the lever-arm $l$ of which is attached to and automatically operated by the wiper-pad frame as the latter rises and falls; or the flow of steam may be constant.

From the foregoing it will be apparent that the essence of this branch of the invention lies in the moistening or wetting the wiper-cloth carried by one or more of the reciprocating pads, and it will be apparent that the same may be accomplished by any of the well-known modes of damping or wetting fabrics without departing from the invention.

While in printing from some plates it is desirable to use both dry and dampened wiper-cloths, I have discovered that where the wiper-cloths are rapidly reciprocated across the onwardly-moving plate a single wiper-cloth, as 25, when wet or dampened, will perfectly perform all of the operations of inking in, wiping, and polishing, so that the resulting print will be a clear and sharp impression, with the blank surfaces pure and clean.

In accomplishing the good results due to the damping of one or more of the wiper-cloths it has been found that, in consequence of the rapidity with which the press works, moisture will remain upon the engraved surface of the plate to a sufficient degree to cause some kinds of paper to adhere to the plate, and thus prevent the printing of such paper at an economical speed. I cause the bulk of this moisture to be removed by means of an adjustable flexible edged scraper, $p$, that is attached to the wiper-pad frame, so as to rise and fall with it; and such surface is dried by means of a series of gas-jets from a pipe, $r$, which burn beneath a deflector, $d$, the supply of gas being controlled by means of a cock, the lever $v$ of which is operated by the corner of the wiper-pad as said pad rises and falls, or its flow may be constant. These devices will thus operate as follows: As the wiper-pad descends to perform its functions upon the plate then passing beneath it the cocks in the pipes $m$ $r$ will be opened and the scraper $p$ be carried into contact with the plate. The steam will then flow onto the cloth 25, and the moisture remaining upon the plate after it passes beneath the wiper-pad will be removed by the scraper $p$, and any dampness remaining upon said plate will be absorbed by the heat from the gas-jets. When the plate has passed these devices the upward movement of the wiper-pads will take place, thus raising the scraper and operating the cocks so as to shut off the steam and so far cut off the flow of gas as to contract the size of the burning jets, and thus greatly reduce the heat, when the printing-plate may make its return movement to be inked.

In printing from an engraved plate upon hard-surfaced paper it has been the practice to steam the surface of the paper, so as to raise its fiber and prepare the same to be perfectly printed, and this mode of treatment is requisite where plated papers are used the surface of which will not bear damping without injury and frequent destruction. To apply this steaming automatically and at the most desirable time—that is, just before the printing operation—I have introduced a steam-pipe near the impression-point, from which live steam is emitted onto the paper while it is passing said pipe. For convenience in illustration, and as a practical construction, I have shown the pipe $m$ to be provided with orifices on the proper side to perform this operation, the operation of which will be obvious from the foregoing description of the action of these pipes in emitting steam onto the cloth 25, it being understood that its controlling-cock may be operated by the vertical reciprocation of the wiper-pad, or by any other suitable means.

It has been found necessary to have the engraved plate heated by contact with or the provision of a heating apparatus, which, to be constantly effective, need not be separated from its near relation to said plate, and as the quantity of heat so applied to the plate must not only be regulated, but its volume governed so as to be greatest when most needed, pipes 118 may be attached to the bed so as to reciprocate with it, (see Fig. 4,) which pipes are connected with a source of supply of gas and provided with holes or small burners. These pipes may be of any number, two serving the purpose and three being preferable.

When they are fastened to the bed so as to reciprocate with it, grooves are provided in the lower cylinder in such a manner as to admit of their passage past the cylinder 61, where it is most necessary that it should be of proper strength to exert great pressure—that is, directly under the plate. There might, however, be one or more grooves near the center of the cylinder instead of near its ends, as shown. To admit of the supply of gas being kept up as the plate reciprocates these pipes are connected with their supply-pipe 121, which must be stationary, by means of a flexible pipe, 120, that runs in the peripheral groove of a wheel, 122, to the hollow shaft of which said pipe 121 is attached by a suitable packing-box. The flexible pipe 120 is connected to the hub of the wheel by means of a short pipe, 123, and the rearward or take-up movement of this pulley is accomplished by a spring coiled about its shaft and moved up as the bed travels forward. In order to avoid grooving this cylinder 61, and thus weakening a member required to exert great pressure, these gas-pipes 118 are connected together to form a frame-work, as in Fig. 19, and provided with guides $g$, whereby said frame is guided in longitudinal grooves formed in the ribs 59 of the bed or plank. The guides $g$ of this frame are engaged by the ends 2 of the said ribs as the plank or bed moves forward, and is thus carried onward with the bed as it moves to ink the plate, the frame and its pipes then occupying a position directly beneath the engraved plate and operating to heat the same. When the reverse movement of the bed or plank is made the frictional resistance of the grooves in the ribs 59, together with the withdrawing power of the spring-actuated wheel 122, causes the frame and pipes 118 to travel with it until its rear end abuts against the cylinder 61, when it is arrested and stands still while the bed moves farther rearward. In this position it acts during the momentary rest of the bed in a position to warm the inking-table 53.

That the gas-flames from each of the pipes may be regular and the heat generated kept uniform, the supply-pipe 120 is attached to the central pipe, 118, whereby the supply of gas is made equal, or nearly so, in each of the pipes, and especially in the side pipes.

To perfect the printing condition of an engraved plate after the same has been inked, it has always been the practice to polish the same by the use of whiting. To accomplish this automatically I have provided a whiting-carrier, $u$, which consists of a holder adapted to contain a brick of whiting, which carrier is supported at the end of a rod, $t$, properly guided so as to be reciprocated vertically by means of a carrying-lever, $w$, the necessary and timely vibrations of which are imparted by means of an appropriately-shaped cam, $f$, that is fast upon the shaft carrying the cams 79 and 134. The upward movement of this whiting-carrier is made at a time when the plate is in its forward position, receiving its ink, and the wiper-pad nearest the printing-cylinder is in its raised position. It is then moved high enough to carry the whiting into contact with the wiper-cloth passing under said wiper-pad, which is constantly reciprocated horizontally, and thus deposits upon said wiper-cloth a slight quantity of whiting sufficient to perfectly polish the plate, when, after being inked and wiped, it passes beneath such wiper-cloth to the printing-cylinder, the said whiting-carrier being lowered out of the way to admit the movement of the plate to its printing position. This whiting-applying mechanism may be equally well applied to the roller form of wiper-pad, and it is practical to place a suitably-shaped brick of whiting in the fountain 116, (the water being removed,) when the roller 115 will operate to take up whiting and apply it to the wiper-cloth 25; or the wiper-cloth might travel in direct contact with the brick of whiting. The wiper-cloth may be supplied with an appropriate amount of whiting by saturating it in a bath or solution of whiting, which cloth, when dried, will contain a very slight or be charged with a sufficient quantity of whiting suitable for the purpose of polishing the plate.

When the action of the charged wiper-cloth is not sufficient the carrier $u$ is brought into action to increase the quantity of whiting upon said cloth. When the whiting is used, of course, the damping of the wiper-cloth will be dispensed with.

To render a plate-printing machine having attachments for wiping and polishing plates perfectly automatic I have devised a take-off or sheet-delivery. It consists in providing the cylinder with tapes $k$, that run over a griper-cylinder, $x$, and return over pulleys $q$. In this arrangement the sheet-gripers 50 of the cylinder 51 will be arranged to open at the proper time to release the sheet at the point where the gripers of the delivery-cylinder $x$ close upon and seize it, which sheet will then be conducted by said gripers over the points of the fly-fingers, and, descending therein, be delivered and piled as they vibrate. Sheets thus piled automatically, in consequence of the fact that the ink is piled upon their surface, require some protection to prevent their becoming spoiled, and it is common to preserve the perfect condition by means of slip-sheets. These are commonly supplied by hand at the present time; but I accomplish their automatic introduction between the printed sheets by providing a second set of gripers in the cylinder 51, which gripers operate in like manner to the gripers 50 during each revolution of the cylinder 51, a sheet to be printed being fed from one table to one set of gripers and delivered by the fly, while a second or slip sheet of tissue is fed from a second table to the second set of gripers and delivered by the fly upon the first or printed sheet. A tissue sheet is thus laid upon each printed sheet.

In preparing the paper for plate-printing it has long been the practice to raise a nap or start the fibers upon the surface by brushing the same. This process imparts a peculiar surface to the paper after it has been damped, and not only takes out any wrinkles, but removes dust and other surface dirt which would injure the impression. To perform this automatically I have arranged a brush in a position in advance of the point where the paper is received, so that the sheet held by the griper upon the impression-cylinder shall be drawn thereby under said brush, the action of which will be to smooth or lay the paper upon the surface of the cylinder, and thus straighten out its surface and remove therefrom any foreign matter, and at the same time nap its face which is to be printed upon. This brush is preferably a rotating one, mounted in adjustable bearings in the side frames and rotated at proper speed by a driving-pulley and a belt running over a pulley on the shaft of the cylinder 51.

Figure 6:
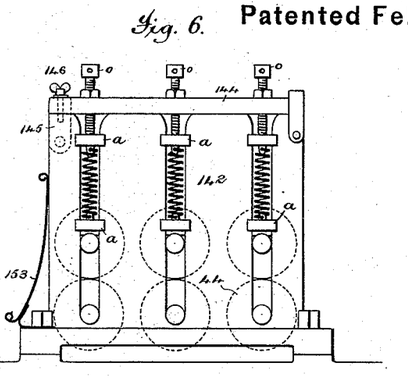
Fig. 6 represents an end elevation of the form-inking mechanism.

For the purpose of causing a wiper-cloth to be fed onward without cutting whenever a wrinkle is passed between the feeding-rollers 103 104, I have made such rollers spring-seated with respect to each other, as in Fig. 7, so that they will not only act to feed the wiper-cloth regularly onward, but accommodate themselves to any undue thickness that may enter between them. To prevent the wiper-cloth nearest the inking-rollers 44 from being smeared thereby when undue slacking of such cloth takes place, I have provided such rollers with a guard, as 153, (see Fig. 6;) and to insure the non-contact of the paper being fed to the printing mechanism from being injured by contact with the wet wiping-cloth 25, I provide guards, as 154.

In printing bank-notes and other tokens having a money value great ingenuity has been developed and many intricate methods devised to defeat the skill of imitators. One of the best of these is the printing in colors, whereby the reproduction of the print by the art of photography is prevented, for the reason that when one color is properly focused another will be out.

In effecting the production of plate-work in more than one color it is necessary that the various bodies of varying colors shall not only be distributed to produce an equal depth of color in the print, but that such distribution shall blend one color into another and be the same for each impression, so as to produce exact repetitions or perfect duplicate multicolored impressions; and, although for some time mechanisms for automatically wiping and polishing inked plates have been in use, it has never been regarded as feasible to mechanically ink intaglio or engraved plates with more than one color, blend such colors into one another, and then automatically wipe or polish said plate and print therefrom. I have discovered that this may not only be accomplished, but that the automatic operation is susceptible of such accurate and perfect work as to produce any number of duplicates of multicolor prints, each color registered and blended with precision and accuracy with respect to the other colors. In accomplishing this I provide the fountain 40 with a number of adjustable division-plates, as 160, which divide the fountain into as many separate receptacles as are required by the number of colors to be used, so that each receptacle in the fountain applies its peculiar ink to the fountain-roller, each color thus forming a ring about the fountain-roller, from which it is deposited by the transferring-roller, so as to form a line or stripes upon the ink-table, where the same are not only distributed, but have their edges blended one into the other, in which condition the ink will ultimately be applied to the engraved plate. A plate so inked will not only have the blended ink laid into the engraved parts of the plate by the rubbing-in action of the wipers, but the said wipers will act to wipe and polish the plate without disturbing the blended relation of one color to another in the plate.

The blending of the colors one into the other at their lines of juncture is accomplished by providing the distributing inking-rollers 43 with an endwise motion, the extent of which may be governed by adjustments to determine the degree of blending. These rollers will not, however, have the endwise movement when the blending is not desired.

To prevent continuous spreading of one color into another in blending work, I provide the plates 160 with inclined guides 162 163, (which may be adjustable,) the function of which is to collect the blended ink remaining upon the fountain-roller, as its surface is re-entering the fountain, and direct it into the fountain, thus cleaning the surface of the roller at the point where it carries blended color, so that it may be recharged with proper colors to be blended by the distributing-rollers.

It is to be understood that the phrase "wiper-cloth" used herein is to be construed to cover bands of paper, leather, or any other material that is suitable for the purpose.

What I claim is—

1. The combination of one or more flexible pads, one or more dampened wiper-cloths, and means for reciprocating the same, substantially as described.

2. The combination of one or more wiper-cloths, each passing under a flexible reciprocating pad, the bearings of which are mounted upon the side frame and provided with devices for regulating the pressure of said wiper-cloths upon the plate or printing-surface, substantially as described.

3. The combination, with one or more moving wiper-cloths, each passing under a flexible reciprocating pad, of means independent of the pad for moving the same continuously onward, so as to constantly present a new wiping-surface, substantially as described.

4. In a plate-printing machine provided with two or more wiper-cloths, a wiper-cloth charged with whiting, substantially as described.

5. The combination, with wiper-cloths and reciprocating pads, of an intermittingly-operating apparatus for applying whiting to one or more of the wiper-cloths, substantially as described.

6. The combination of one or more pads covered with dry wiper-cloths and one or more pads covered with wet wiper-cloths, said pads and cloths being provided with means for producing their reciprocation, and arranged in such relation that the wet cloth or cloths shall act last upon the plate or printing-surface, all substantially as described.

7. The combination, with two wiper-pads, of a single wiper-cloth and a means for turning the same after it passes one wiper-pad, so as to present the opposite face as it passes over the second wiper-pad, all substantially as described.

8. The combination, with a wiper-cloth, of a wiper-pad having a curved bearing-surface, which pad is laterally reciprocated over the plate, but has no surface movement, or substantially none, in the opposite direction during the wiping operation, all substantially as described.

9. The combination, with a wiper-cloth and its pad, of a moisture-supply pipe, as 143, leading to said pad, substantially as described.

10. The combination of a wiper-cloth, its pad, damping-fountain, and moisture-supply pipe, as 143, substantially as described.

11. The combination, with a wiper-pad and a wiper-cloth, of an apron or belt, as b, whereby a constantly-changing bearing-surface is provided, substantially as described.

12. The combination, with the impression-cylinder 51, of the steam-pipe, as m, substantially as described.

13. The combination, with the printing-plate or surface, wiper-pad, and wiper-cloth, of the gas-pipe, as r, and means automatically operated to control the flow of its supply of gas, substantially as described.

14. The combination, with the printing plate or surface, wiper-pad, and wiper-cloth, of the steam-pipe, as m, and means automatically operated to control the flow of steam therefrom, substantially as described.

15. The combination, with the bed and its heating-pipes 118, of a supply-pipe connected thereto, so as to feed the same from a central point, and thus cause an even distribution of the gas, substantially as described.

16. The combination, with the bed or plate-carrying plank, of gas-pipes, arranged, substantially as described, to reciprocate with said bed and come to a state of rest while the bed moves rearward, whereby both the plate and inking-table are heated.

17. The combination, with the wiper-cloth and its pad, of the reciprocating whiting-carrier u, substantially as described.

18. The improvement in the art of plate-printing, the same consisting in applying multicolors to the inking-table, blending the edges of the same, applying the blended ink to the engraved plate or printing-surface, and wholly or partially wiping said plate, all substantially as described.

19. The combination, with the impression-cylinder, of a revolving sheet-laying nap-raising brush, as 2, substantially as described.

20. The combination, with the impression-cylinder, of two sets of gripers and means for operating them, arranged so as to receive successive sheets at the same point, and means to deliver the same in succession one upon the other, whereby a sheet may be fed to be printed and a slip-sheet be fed which will not be printed, and the latter be laid upon the former, substantially as described.

21. A delivering mechanism consisting of an impression-cylinder provided with two sets of gripers and means for operating the same, so as to receive sheets successively at a common point, carry one sheet only of a pair into contact with the printing-surface, and release both sheets successively at a common point to a receiving-cylinder, as x, whereby alternate sheets are printed and the sheets are delivered in a common pile, a plain sheet resting upon a printed sheet, all substantially as described.

22. The combination, with the engraved printing-surface, of a gas-jet located above its path of travel, for removing the moisture from its surface, substantially as described.

23. The combination, with the engraved printing-surface and the wiper cloth and pad, of a scraper, as p, arranged to operate upon said surface, substantially as described.

24. The combination, with one or more flexible pads with a hard surface, as leather, of one or more flexible pads with a soft surface, as cloth, each of said pads acting as carriers for wiping-cloths passed over them, and being provided with means for reciprocating said pads, all substantially as described.

25. The combination, with the wiper-cloth carrier, as 26, and the means for feeding it onward, of the star-wheel 28, pawl 29, and cushion c, substantially as described.

26. The combination, with the wiper-cloth carrier, as 26, and means for feeding it onward, of the star-wheel 28, pawl 29, and the spring S, substantially as described.

27. The combination, with the ink-fountain, of partitions, as 160, having flaring guides 162 163, substantially as described.

28. The combination, with the wiper-pad, of its plate 149 and adjusting-screws, arranged near its opposite edges, so that opposite sides of the pad may be adjusted independently, substantially as described.

In testimony whereof I have hereunto set my hand in the presence of two subscribing witnesses.

HOMER LEE.

Witnesses:
T. H. PALMER,
GEO. H. GRAHAM.